United States Patent
Xiong

(10) Patent No.: US 10,992,573 B2
(45) Date of Patent: Apr. 27, 2021

(54) MULTI-LAYER LSP CONTROL METHOD AND APPARATUS

(71) Applicant: ZTE CORPORATION, Shenzhen (CN)

(72) Inventor: Quan Xiong, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 385 days.

(21) Appl. No.: 16/082,083

(22) PCT Filed: Nov. 16, 2017

(86) PCT No.: PCT/CN2017/111299
§ 371 (c)(1),
(2) Date: Sep. 4, 2018

(87) PCT Pub. No.: WO2018/113460
PCT Pub. Date: Jun. 28, 2018

(65) Prior Publication Data
US 2020/0296032 A1   Sep. 17, 2020

(30) Foreign Application Priority Data

Dec. 23, 2016   (CN) .......................... 201611205840.7

(51) Int. Cl.
*H04L 12/723*      (2013.01)
*H04L 12/751*      (2013.01)
(Continued)

(52) U.S. Cl.
CPC .............. *H04L 45/50* (2013.01); *H04L 45/02* (2013.01); *H04L 45/04* (2013.01); *H04L 45/28* (2013.01); *H04L 47/724* (2013.01)

(58) Field of Classification Search
None
See application file for complete search history.

(56) References Cited

U.S. PATENT DOCUMENTS 7,480,283 B1   1/2009   Sylvain
7,944,817 B1   5/2011   Sylvain
(Continued)

FOREIGN PATENT DOCUMENTS

CN   101030939 A   9/2007
CN   101841487 A   9/2010
(Continued)

OTHER PUBLICATIONS

International Search Report in the international application No. PCT/CN2017/111299, dated Jan. 29, 2018, 2 pgs.
(Continued)

*Primary Examiner* — Yaotang Wang
(74) *Attorney, Agent, or Firm* — Li & Cai Intellectual Property (USA) Office

(57) ABSTRACT

Disclosed are a multi-layer LSP control method and apparatus. The method comprises: acquiring a label switched path (LSP) addition request, wherein the LSP addition request carries identifier information for identifying a layer associated group that the LSP is to be added to; and in response to the LSP addition request, adding the LSP to the layer associated group, wherein the layer associated group comprises: an upper-layer LSP and several lower-layer LSPs.

15 Claims, 5 Drawing Sheets

```
   0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Reserved             |           Flags             |R|
+-+-+-+-+-+-+-+-+-+-+-+-+-+-+-+-+-+-+-+-+-+-+-+-+-+-+-+-+-+-+-+-+
|     Association type = TBD1   |         Association           |
+-+-+-+-+-+-+-+-+-+-+-+-+-+-+-+-+-+-+-+-+-+-+-+-+-+-+-+-+-+-+-+-+
|                    IPv4 Association Source                    |
+-+-+-+-+-+-+-+-+-+-+-+-+-+-+-+-+-+-+-+-+-+-+-+-+-+-+-+-+-+-+-+-+
//                     Optional TLVs                           //
+-+-+-+-+-+-+-+-+-+-+-+-+-+-+-+-+-+-+-+-+-+-+-+-+-+-+-+-+-+-+-+-+
```

(51) Int. Cl.
*H04L 12/715* (2013.01)
*H04L 12/703* (2013.01)
*H04L 12/913* (2013.01)

(56) References Cited

U.S. PATENT DOCUMENTS

| | | | |
|---|---|---|---|
| 8,203,965 B1* | 6/2012 | Vijendra | H04L 41/145 370/254 |
| 8,504,718 B2 | 8/2013 | Wang et al. | |
| 2011/0271007 A1 | 11/2011 | Wang | |
| 2012/0076046 A1* | 3/2012 | Lin | H04L 47/724 370/254 |
| 2013/0322451 A1 | 12/2013 | Wang et al. | |
| 2014/0307538 A1* | 10/2014 | Iovanna | H04L 45/28 370/218 |
| 2016/0352636 A1 | 12/2016 | Zheng et al. | |
| 2017/0187615 A1* | 6/2017 | Beeram | H04L 45/50 |

FOREIGN PATENT DOCUMENTS

| | | |
|---|---|---|
| CN | 101945048 A | 1/2011 |
| CN | 102201970 A | 9/2011 |
| CN | 103580884 A | 2/2014 |
| CN | 103795629 A | 5/2014 |
| EP | 3099010 A1 | 11/2016 |

OTHER PUBLICATIONS

English Translation of the Written Opinion of the International Search Authority in the international application No. PCT/CN2017/111299, dated Jan. 29, 2018, 3 pgs.
PCEP Extensions for Establishing Relationships Between Sets of LSPs; Jul. 2016; I. Minei, E. Crabbe, S. Sivabalan, H. Ananthakrishan, X, Zxang andY. Tanaka; Internet Engineering Task Force, IETF; Standardworkl NGDraft, Internet Society; 13 pgs.
"Applicability of a Stateful Path Computation Element (PCE)"; Oct. 2016; X. Zhang and Minei, Internet Engineering Task Force, IETF, Standard World NGDraft, Internet Society, 23 pgs.
Supplementary European Search Report in the European application No. 17884099.7, dated Apr. 2, 2019, 8 pgs.
China Patent Office, First Office Action dated Dec. 31, 2019, for corresponding Chinese application No. 201611205840.7.
China Patent Office, Second Office Action dated May 21, 2020, for corresponding Chinese application No. 201611205840.7.
China Patent Office, Third Office Action dated Sep. 7, 2020, for corresponding Chinese application No. 201611205840.7.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|           Reserved            |            Flags            |R|
+-+-+-+-+-+-+-+-+-+-+-+-+-+-+-+-+-+-+-+-+-+-+-+-+-+-+-+-+-+-+-+-+
|   Association type = TBD1     |         Association           |
+-+-+-+-+-+-+-+-+-+-+-+-+-+-+-+-+-+-+-+-+-+-+-+-+-+-+-+-+-+-+-+-+
|                    IPv4 Association Source                    |
+-+-+-+-+-+-+-+-+-+-+-+-+-+-+-+-+-+-+-+-+-+-+-+-+-+-+-+-+-+-+-+-+
//                       Optional TLVs                        //
+-+-+-+-+-+-+-+-+-+-+-+-+-+-+-+-+-+-+-+-+-+-+-+-+-+-+-+-+-+-+-+-+
```

FIG. 3

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|           Reserved            |            Flags            |R|
+-+-+-+-+-+-+-+-+-+-+-+-+-+-+-+-+-+-+-+-+-+-+-+-+-+-+-+-+-+-+-+-+
| Association Type = TBD1       |         Association           |
+-+-+-+-+-+-+-+-+-+-+-+-+-+-+-+-+-+-+-+-+-+-+-+-+-+-+-+-+-+-+-+-+
|                                                               |
|                    IPv6 Association Source                    |
|                                                               |
|                                                               |
+-+-+-+-+-+-+-+-+-+-+-+-+-+-+-+-+-+-+-+-+-+-+-+-+-+-+-+-+-+-+-+-+
//                       Optional TLVs                        //
+-+-+-+-+-+-+-+-+-+-+-+-+-+-+-+-+-+-+-+-+-+-+-+-+-+-+-+-+-+-+-+-+
```

FIG. 4

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-
|         Type = TBD2           |            Length             |
+-+-+-+-+-+-+-+-+-+-+-+-+-+-+-+-+-+-+-+-+-+-+-+-+-+-+-+-+-+-+-+-
|         Layer Association Flags     |H|L|                     |
+-+-+-+-+-+-+-+-+-+-+-+-+-+-+-+-+-+-+-+-+-+-+-+-+-+-+-+-+-+-+-+-
```

FIG. 5

MULTI-LAYER LSP CONTROL METHOD AND APPARATUS

TECHNICAL FIELD

The disclosure relates to the field of mobile communications, and in particular to a method and an apparatus for controlling multi-layer label switched paths (LSP).

BACKGROUND

A structure based on a path computation element (Path Computation Element, abbreviated as PCE) is described in the RFC4655. The structure is used for path computations of label switched paths (Label Switched Paths, abbreviated as LSP) of traffic engineer (Traffic Engineer, abbreviated as TE) of multi-protocol label switching (Multi-Protocol Label Switching, abbreviated as MPLS) and generalized multi-protocol label switching (Generalized Multi-Protocol Label Switching, abbreviated as GMPLS).

Specifically, the PCE is an entity, a component, an application or a network node capable of computing a network path or route based on a network map and applying constraints of computation. A path computation client (Path Computation Client, abbreviated as PCC) is a client application for requesting the PCE to perform path computation.

It is proposed in the RFC5440 that, the PCEP protocol is used as the communication protocol between the PCE and the PCC, and the PCC requests the PCE to perform path computation or route computation according to the PCEP protocol. In an MPLS network or a GMPLS network, when a user creates an LSP, the first node is generally used as the PCC to request the PCE to perform path computation, and a result of the computation is returned to the PCC, and then the PCC initiates establishment of the LSP signaling.

In recent years, the requirements and applications of a stateful PCE have been proposed. For the stateful PCE, the PCC can authorize the control of the LSP to the PCE. In the draft-ietf-pce-stateful-pce-16, it is proposed an extension of the PCEP protocol by the stateful PCE. In the ietf-pce-stateful-pce-app, it is proposed the requirements of control of LSPs at different layers and TE links in multi-layer networks (Multi-Layer Networks, abbreviated as MLN) in the stateful PCE.

SUMMARY

The following is a summary of the subject matter in detailed description in the present disclosure. This Summary is not intended to limit the scope of protection of the claims.

A method and an apparatus for controlling multi-layer LSPs are provided according to the present disclosure.

In accordance with an aspect of the present disclosure, a method for controlling multi-layer LSPs is provided according to the present disclosure, which includes: acquiring an LSP addition request, where the LSP addition request carries identifier information for identifying a layer association group, to which an LSP is to be added; and adding the LSP to the layer association group in response to the LSP addition request, where the layer association group includes an upper-layer LSP and a number of lower-layer LSPs.

In an exemplary embodiment, a path computation client (PCC) or a path computation element (PCE) is responsible for creating and deleting the layer association group, and for adding one or more LSPs to or deleting one or more LSPs from the layer association group.

In an exemplary embodiment, the upper-layer LSP and the number of lower-layer LSPs in the layer association group are associated by using an ASSOCIATION object.

In an exemplary embodiment, the ASSOCIATION object is in a format of including a field for identifying a type of the ASSOCIATION object, and the field is used to indicate that a current association group is the layer association group.

In an exemplary embodiment, a type of each LSP in the layer association group is indicated by a bit indicating the type of the LSP in a layer association type-length-value (TLV), where the type of the LSP includes an upper-layer LSP and a lower-layer LSP.

In an exemplary embodiment, the method for controlling multi-layer LSPs further includes: receiving an upper-layer LSP deletion request; searching the layer association group for at least one lower-layer LSP associated with the upper-layer LSP requested to be deleted in the upper-layer LSP deletion request, in response to the upper-layer LSP deletion request; and deleting the upper-layer LSP requested to be deleted in the upper-layer LSP deletion request, and deleting the at least one low-layer LSP associated with the upper-layer LSP requested to be deleted in the upper-layer LSP deletion request, in batches.

In an exemplary embodiment, the method for controlling multi-layer LSPs further includes: receiving an upper-layer LSP bandwidth adjustment request; and in case that the upper-layer LSP bandwidth adjustment request is a request for increasing a bandwidth of the upper-layer LSP, firstly searching, the layer association group, for all the lower-layer LSPs corresponding to the layer association group, adjusting bandwidths of the lower-layer LSPs, and then adjusting the bandwidth of the upper-layer LSP; or in case that the upper-layer LSP bandwidth adjustment request is a request for decreasing the bandwidth of the upper-layer LSP, firstly adjusting the bandwidth of the upper-layer LSP, and then searching the layer association group for all the lower-layer LSPs corresponding to the layer association group and adjusting the bandwidths of the lower-layer LSPs.

In an exemplary embodiment, the method for controlling multi-layer LSPs further includes: receiving a low-layer LSP request, where the low-layer LSP request includes at least one of the following: a delete request, or a fault alarm request; searching the layer association group for the upper-layer LSP associated with the lower layer LSP requested in the lower-layer LSP request, in response to the low-layer LSP request; and performing the low-layer LSP request according to a local policy, notifying the upper-layer LSP that is searched out, and performing related processing on the upper-layer LSP that is searched out according to the local policy.

In accordance with another aspect of the present disclosure, an apparatus for controlling multi-layer LSPs is provided according to the present disclosure, which includes an acquiring module and an adding module. The acquiring module is arranged to acquire an LSP addition request, where the LSP addition request carries identifier information for identifying a layer association group, to which an LSP is to be added. The adding module is arranged to add the LSP to the layer association group in response to the LSP addition request, where the layer association group includes an upper-layer LSP and a number of lower-layer LSPs.

In an exemplary embodiment, a PCC or a PCE is responsible for creating and deleting the layer association group, and for adding one or more LSPs to or deleting one or more LSPs from the layer association group.

In an exemplary embodiment, the upper-layer LSP and the number of lower-layer LSPs in the layer association group are associated by using an ASSOCIATION object.

In an exemplary embodiment, the ASSOCIATION object is in a format of including a field for identifying a type of the ASSOCIATION object, and the field is used to indicate that a current association group is the layer association group.

In an exemplary embodiment, a type of each LSP in the layer association group is indicated by a bit indicating the type of the LSP in a layer association type-length-value (TLV), where the type of the LSP includes an upper-layer LSP and a lower-layer LSP.

In an exemplary embodiment, the apparatus for controlling multi-layer LSPs further includes a first receiving module, a first searching module and a deleting module. The first receiving module is arranged to receive an upper-layer LSP deletion request. The first searching module is arranged to search the layer association group for at least one lower-layer LSP associated with the upper-layer LSP requested to be deleted in the upper-layer LSP deletion request, in response to the upper-layer LSP deletion request. The deleting module is arranged to delete the upper-layer LSP requested to be deleted in the delete upper-layer LSP request, and delete the at least one low-layer LSP associated with the upper-layer LSP requested to be deleted in the delete upper-layer LSP request, in batches.

In an exemplary embodiment, the apparatus for controlling multi-layer LSPs further includes a second receiving module and one of a first adjusting module and a second adjusting module. The second receiving module is arranged to receive an upper-layer LSP bandwidth adjustment request. The first adjusting module is arranged to, in case that the upper-layer LSP bandwidth adjustment request is a request for increasing a bandwidth of the upper-layer LSP, firstly search, the layer association group, for all the lower-layer LSPs corresponding to the layer association group, adjust bandwidths of the lower-layer LSPs, and then adjust the bandwidth of the upper-layer LSP. The second adjusting module is arranged to, in case that the upper-layer LSP bandwidth adjustment request is a request for decreasing the bandwidth of the upper-layer LSP, firstly adjust the bandwidth of the upper-layer LSP, and then search the layer association group for all the lower-layer LSPs corresponding to the layer association group and adjust the bandwidths of the lower-layer LSPs.

In an exemplary embodiment, the apparatus for controlling multi-layer LSPs further includes a third receiving module, a second searching module, and a processing module. The third receiving module is arranged to receive a low-layer LSP request, where the low-layer LSP request includes at least one of the following: a delete request, or a fault alarm request. The second searching module is arranged to search the layer association group for the upper-layer LSP associated with the lower layer LSP requested in the lower-layer LSP request, in response to the low-layer LSP request. The processing module is arranged to perform the low-layer LSP request according to a local policy, notify the upper-layer LSP that is searched out, and perform related processing on the upper-layer LSP that is searched out according to the local policy.

The present disclosure has the following beneficial effects. By creating and adding to a layer association group, an association group of the multi-layer LSPs is realized, and optimal control of the multi-layer LSPs is realized, thereby solving the problem that the multi-layer LSPs cannot be easily and effectively associated. The technical effects are achieved that the message interaction between the PCC and the PCE is effectively reduced and the control efficiency of the multi-layer LSPs is optimized.

Other aspects will be understood upon reading and understanding the drawings and detailed description.

BRIEF DESCRIPTION OF DRAWINGS

FIG. 3 is a schematic diagram showing a format of ASSOCIATION Object of a layer association group Ipv4 according to an embodiment of the present disclosure;

FIG. 4 is a schematic diagram showing a format of ASSOCIATION Object of a layer association group Ipv6 according to an embodiment of the present disclosure;

FIG. 5 is a schematic diagram showing a format of LAYER ASSOCIATION TLV according to an embodiment of the present disclosure;

DETAILED DESCRIPTION

Figure 1:
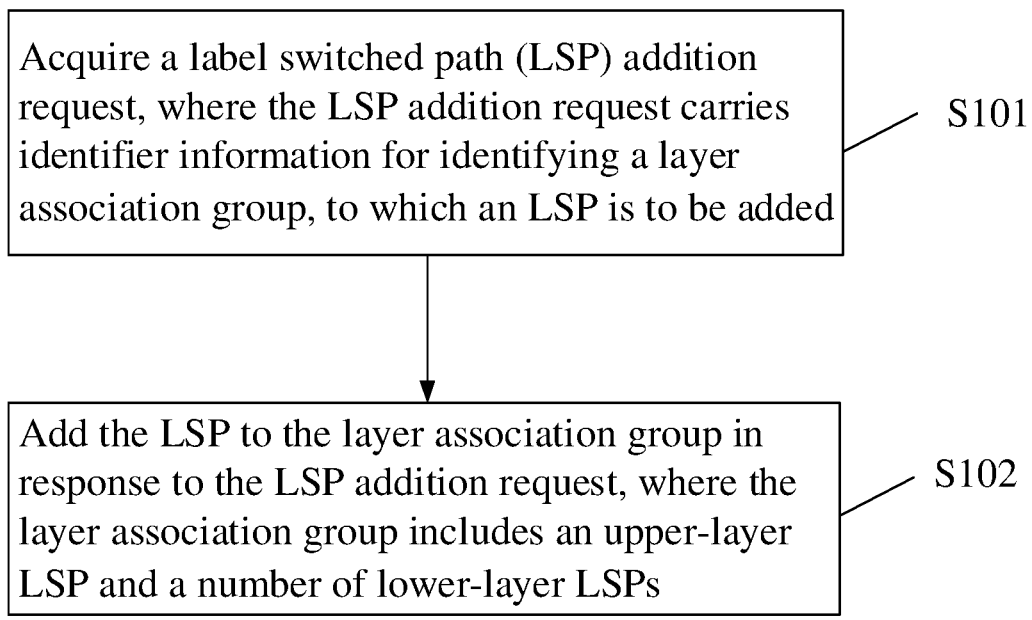
FIG. 1 is a method flowchart showing a method for controlling multi-layer LSPs according to an embodiment of the present disclosure.

In a GMPLS/MPLS network, a service provider divides the network into multiple service layers according to requirements. A customer network is the uppermost-layer service, and the service provider takes connections for providing lower-layer services to the customer network as the forwarding adjacency LSPs (Forwarding Adjacency, abbreviated as FA-LSPs). The connection of lower-layer services creates multi-layer LSPs based on a switching capability of a network device. According to the concept of a virtual network topology (Virtual Network Topology, abbreviated as VNT) proposed in the RFC5212, one or more TE LSPs in the lower layer provides TE links to a higher layer. It is proposed in the RFC5623 that a network based on the PCE architecture supports the path computation of TE links between layers of the MLN.

However, the creation and deletion of the lower-layer TE links should be notified to all the created LSPs on the TE links provided to the higher layer, and the corresponding processing is performed. However, a stateless PCE cannot obtain information on the lower-layer LSP. Hence, it cannot be determined whether to create/delete the upper-layer TE links or LSP at this time. A stateful PCE can determine whether to optimize the links and the LSPs based on the lower-layer LSPs and the upper-layer TE Links generated by the lower-layer LSPs, and update the LSPs of the upper-layer network in time based on the existing resources and LSP status when the lower-layer LSP fails.

In addition, it is proposed a method for dynamically adjusting a bandwidth by using the stateful PCE in the draft-dhody-pce-stateful-pce-auto-bandwidth-08. However, in conjunction with multi-layer networks, in case that the upper-layer LSP bandwidth is to be adjusted, it is necessary to adjust bandwidths of the lower-layer LSPs from which the TE links are generated. Hence, it is required to solve the problem of controlling multi-layer LSPs in the PCE network.

It is proposed a method for associating a group of LSPs in the draft-ietf-pce-association-group-01, in which it is proposed that a group of LSPs and related attributes may be associated in a manner of an association group. In addition, the stateful PCE provides the capability to update the LSPs, and defines an association group between LSPs or a series of LSPs with common configuration parameters.

It has not yet proposed an effective solution how to associate multi-layer LSPs and its TE links.

It is provided a method and an apparatus for controlling multi-layer LSPs according to the present disclosure. The present disclosure will be described in detail below in conjunction with the accompany drawings and embodiments. It is to be understood that the exemplary embodiments described herein are merely used to explain but not limit the present disclosure.

In order to control multi-layer networks, the association group of multi-layer LSPs may be implemented. For example, the optimal control of the multi-layer LSPs may be realized by extending a message and a field of the PCEP protocol.

As shown in FIG. 1, it is provided a method for controlling multi-layer LSPs, which may include the following steps.

In step 101, an LSP addition request is acquired, where the LSP addition request carries identifier information for identifying a layer association group, to which an LSP is to be added.

Specifically, a PCC or a PCE may be responsible for creating and deleting the layer association group. That is, the PCC may create the layer association group by itself, or the PCC may control a stateful PCE to create the layer association group, and adds or deletes one upper-layer LSP and one or more lower-layer LSPs to/from the association group.

There may be an upper-layer LSP or a lower-layer LSP in a layer association group, and the LSPs are associated with each other. For example, an upper-layer LSP and a number of lower-layer LSPs in the layer association group may be associated by using an ASSOCIATION object.

In this example, it may be characterized whether the current association group is a layer association group by extending a format of the ASSOCIATION object. That is, a field for identifying a type of the ASSOCIATION object may be added to the format of the ASSOCIATION object, and the field is used to indicate that the current association group is a layer association group. For example, the type TDB1 of the Association Type may be added as the layer association type (Layer Association Type), which indicates that the association group is a layer association group.

In step 102, the above-described LSP is added to the layer association group in response to the above-described LSP addition request, where the above-described layer association group includes an upper-layer LSP and a number of lower-layer LSPs.

For each LSP, a type of each LSP may be indicated by a layer association TLV, for example, indicating whether the LSP is an upper-layer LSP or a lower-layer LSP. In an example, a type of each LSP in the layer association group may be indicated by a bit indicating the type of the LSP in a layer association TLV, where the type of the LSP includes an upper-layer LSP and a lower-layer LSP.

For example, the Layer Association TLV may be extended, which is optional, and can only be existed once. A format of the Layer Association TLV may include the following fields:

1) Type: TBD2, 16 bits, for indicating that the TLV is a LAYER ASSOCIATION TLV;
2) Length: 16 bits, for indicating a length of the TLV;
3) Layer Association Flags-H: 1 bit, indicating that the LSP is a higher-layer LSP when being set to 1; and
4) Layer Association Flags-L: 1 bit, indicating that the LSP is a lower-layer LSP when being set to 1.

After the layer association group is created, the associated upper-layer LSP or lower-layer LSP may be found from the layer association group and the corresponding process flow may be performed according to a policy.

For example, an upper-layer LSP deletion request may be received; at least one lower-layer LSP associated with the upper-layer LSP requested to be deleted in the upper-layer LSP deletion request may be found from the layer association group, in response to the upper-layer LSP deletion request; then the upper-layer LSP requested to be deleted in the upper-layer LSP deletion request is deleted, and the at least one low-layer LSP associated with the upper-layer LSP requested to be deleted in the upper-layer LSP deletion request is deleted, in batches.

For example, an upper-layer LSP bandwidth adjustment request may further be received; at least one lower-layer LSP associated with the upper-layer LSP requested to be adjusted in the upper-layer LSP bandwidth adjustment request may be found from the layer association group, in response to the upper-layer LSP bandwidth adjustment request; then, in case that the upper-layer LSP bandwidth adjustment request is a request for increasing a bandwidth of the upper-layer LSP, bandwidths of the lower-layer LSPs are firstly adjusted, and then the bandwidth of the upper-layer LSP is adjusted; or in case that the upper-layer LSP bandwidth adjustment request is a request for decreasing the bandwidth of the upper-layer LSP, the bandwidth of the upper-layer LSP is firstly adjusted, and then the bandwidths of the lower-layer LSPs are adjusted.

For example, a low-layer LSP request may further be received, such as a delete request or a fault alarm request; the upper-layer LSP associated with the lower layer LSP requested in the lower-layer LSP request may be found from the layer association group, in response to the low-layer LSP request; and the low-layer LSP request, such as a delete request or a fault alarm request, may be performed according to a local policy, the upper-layer LSP may be notified of the LSP request, and related processing may be performed on the upper-layer LSP according to the local policy.

That is, in the above-mentioned use case, the creation/deletion of the layer association group is actively initiated by a PCE or a PCC, and multi-layer LSPs are added to/deleted from the layer association group, then the associated upper-layer LSP or lower-layer LSP is found from the layer association group, and a related process flow is performed according to the policy.

The extending of attribute information of a layer association group in extending the PCEP protocol may include: extending the ASSOCIATION object of the PCEP protocol to carry identification fields such as a type of a layer association group and a level of an LSP. In the above-described step of extending a configuration attribute of the layer association group in extending the PCEP protocol, the parameter of the layer association group may be carried in the ASSOCIATION object in the PCReq, PCRpt, PCUpd or PCInit message.

For individual operations in each instance, repeat of these operations may be reduced in the above way. By using the association group, the upper-layer LSP, the lower-layer LSP and the related TE link in multi-layer networks may be associated, thereby reducing the message interaction between the PCC and PCE effectively, and optimizing the control efficiency of multi-layer LSPs greatly.

The above-described method for controlling multi-layer LSPs is illustrated in conjunction with an exemplary embodiment. However, it should be noted that, the exemplary embodiment is only for the purpose of illustrating the present disclosure better and does not unduly limit the present disclosure.

Figure 2:
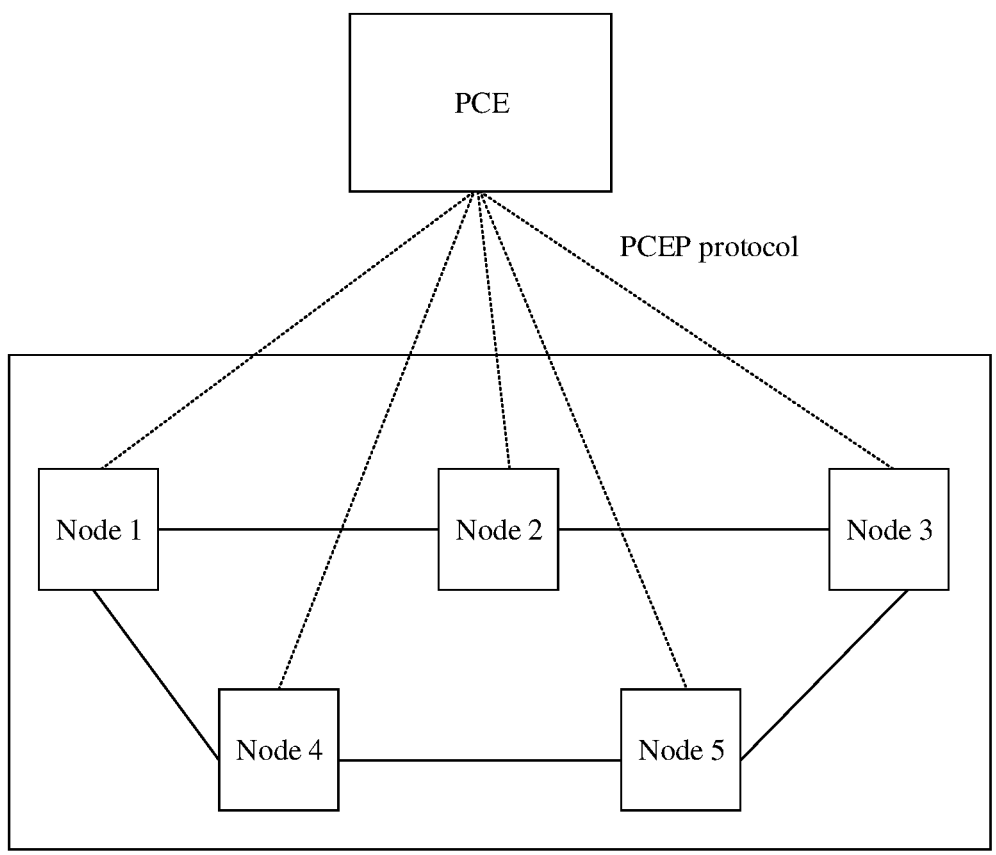
FIG. 2 is a schematic diagram showing a network architecture of a PCE according to an embodiment of the present disclosure.

In order to optimize the control of multi-layer networks in a scene of a stateful PCE, it is provided a method for associating multi-layer LSPs and its TE links in this example. As shown in FIG. 2, FIG. 2 is a schematic diagram showing an architecture of the PCE. The communication between a PCE and a network node is performed according to the PCEP protocol. A stateful PCE allows the PCE to initiate creation of LSP actively, and also allows a PCC to request the PCE to perform path computation and authorize the PCE after creating the LSP.

In the stateful PCE, the PCE and the PCC can create/update LSPs at various layers respectively, including an upper-layer LSP and a service layer LSP constituting the links of the upper-layer LSP, i.e., a lower-layer LSP. A group of LSPs may be associated in a form of an association group, and LSPs at respective layers may be associated by using an ASSOCIATION object according to the PCEP protocol. Specifically, the association group may be created by the PCE or the PCC, and one or more LSPs may be added to or deleted from the association group. Hence, in this example, a group of multi-layer LSPs may be associated in a form of an association group by the PCC or the PCE, and one or more LSPs may also be deleted from the association group.

In a multi-layer network, in case that an upper-layer LSP is to be associated with the lower-layer LSP used as a TE link of the upper-layer LSP, these multi-layer LSPs may be added to a common association group. For example, the service connection provided to the user is used as the upper-most layer LSP which is defined as an L3-layer LSP. In order to create the L3-layer LSP, a network on the L2 layer creates a number of L2-layer LSPs as FA-LSPs for the L3-layer LSP. In order to create the L2-layer LSP, the L1-layer LSPs provides TE Links for the L2-layer LSP. Hence, associated LSPs of L1, L2 and L3 layers may be added to the association group.

In order to associate multi-layer LSPs in the multi-layer network, the type of the ASSOCIATION object may be extended to indicate that the association group is a layer association group. As shown in FIG. 3, a format of the ASSOCIATION object of the layer association group IPv4 is illustrated. As shown in FIG. 4, a format of the ASSOCIATION object of the layer association group IPv6 is illustrated. Specifically, a type TDB1 of the Association Type is added as a Layer Association Type, which indicates that the association group is a layer association group. An association group may be formed by LSPs at multiple layers or LSPs at a single layer.

In the example, the Layer Association TLV is further extended, which is optional, and can only be existed once. A format of the Layer Association TLV may be as shown in FIG. 5, and the description of each field is as follows:

Type: TBD2, 16 bits, for indicating that the TLV is a LAYER ASSOCIATION TLV;
Length: 16 bits, for indicating a length of the TLV;
Layer Association Flags-H: 1 bit, indicating that the LSP is a higher-layer LSP when being set to 1; and
Layer Association Flags-L: 1 bit, indicating that the LSP is a lower-layer LSP when being set to 1.

In a stateless PCE, the ASSOCIATION object may be carried in a PCReq message that the PCC requests path computation to the PCE, and indicates that the LSP is added to the association group. In case that the association group changes, the PCC may report the change of the association group to the PCE by the PCRpt message.

In a stateful PCE, after the PCC authorizes the LSP to the stateful PCE, the PCE may create a new association group or associate the LSP with an existing association group.

During a state synchronization process between the PCC and the PCE, the PCC may also report all existing association groups of multi-layer LSPs to the PCE. The Association object may be carried in a PCReq, PCRpt, PCUpd or PCInit message.

After being created, a group of multi-layer LSPs may be associated in a form of a multi-layer Association group, and the multi-layer LSPs including the upper-layer LSP and the lower-layer LSP are added to the association group by the PCC or the PCE.

In case that an upper-layer LSP is to be deleted, the lower-layer LSPs associated with the upper-layer LSP may be searched for and be deleted in batches.

In case that an upper-layer LSP is to be modified, for example, to adjust a bandwidth, the lower-layer LSPs associated with the upper-layer LSP may be searched for, and bandwidths of the lower-layer LSPs are adjusted as needed.

In case that the lower-layer LSP changes, such as a deletion or a broken link fault of the lower-layer LSP, the upper-layer LSP corresponding to the lower-layer LSP may be found based on information on the association group, and the change is reported and related processing of the upper-layer LSP is initiated.

However, it should be noted that, the above-described scenes of deleting an upper-layer LSP, adjusting an upper-layer LSP, and deletion or an alarm request of a lower-layer LSP are only a schematic description for better illustrating the present disclosure. The present disclosure may also be adapted to other scenes, that is, scenes of controlling other multi-layer LSPs which may be solved or optimized by using the method for a layer association group.

Figure 6:
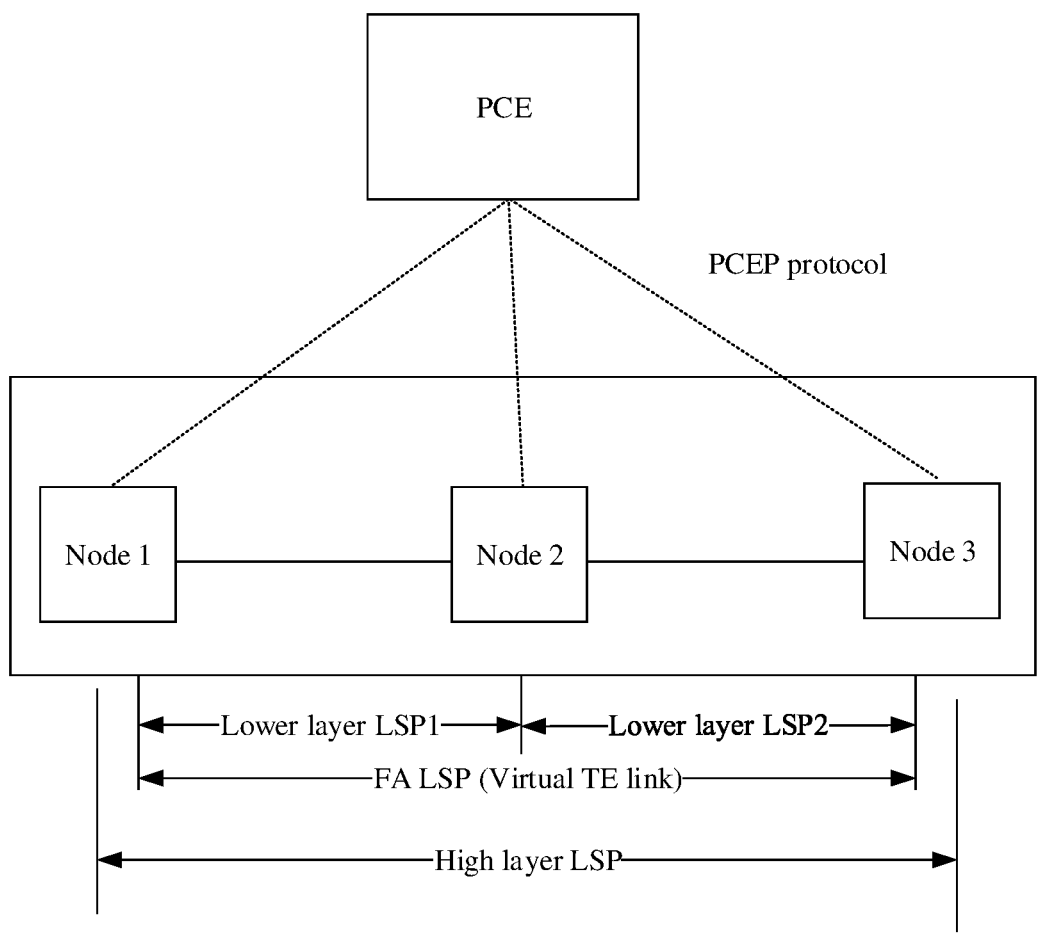
FIG. 6 is a schematic diagram showing multi-layer LSPs according to an embodiment of the present disclosure.

As shown in FIG. 6, in the PCE network, as a PCC, node 1 requests a PCE to compute a path of the upper-layer LSP to node 3, but there is no direct-connected upper-layer TE link between the two nodes. The service layers LSP1 and LSP2 are created through node 2 to provide with an FA-LSP as their virtual TE link.

It is illustrated with reference to several examples as follows.

Example One

Figure 7:
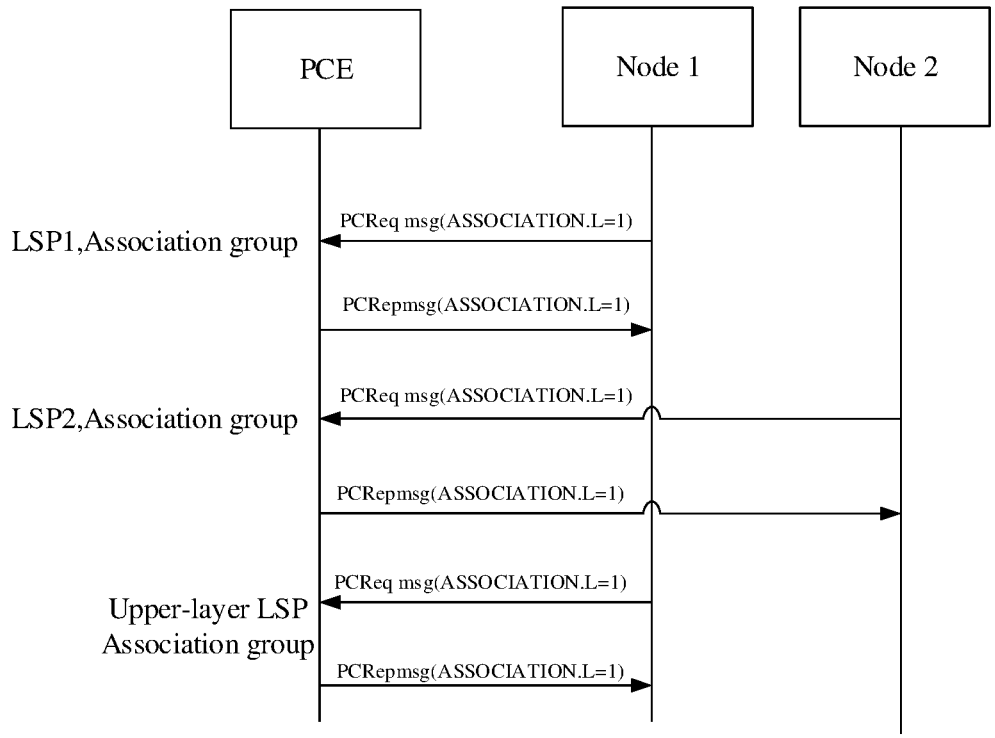
FIG. 7 is a flow diagram showing creation of multi-layer LSPs according to an embodiment of the present disclosure.

The PCC requests the PCE to perform path computation, create a layer association group, and add the associated LSPs to the layer association group. As shown in FIG. 7, an interaction process between the PCE and the PCC is as follows.

In step S1, as a PCC, the node 1 sends a PCReq message to the PCE, and requests to compute the service layer LSP1 from the node 1 to the node 2, and the message carries the Association object including the LAYER ASSOCIATION TLV. The L bit is set to 1 to notify the PCE that the LSP is a lower-layer LSP, and the LSP is added to the layer association group.

In step S2, the PCE computes a path of a service layer, saves information on the LSP, creates a layer association group, adds the LSP1 to the layer association group, and returns a result of path computation to the node 1.

In step S3, as a PCC, the node 2 sends a PCReq message to the PCE, and requests to compute the service layer LSP2 from the node 2 to the node 3, and the message carries the Association object including the LAYER ASSOCIATION TLV. The L bit is set to 1 to notify the PCE that the LSP2 is a lower-layer LSP, and the LSP is added to the layer association group.

In step S4, the PCE computes a path of a service layer, saves information on the LSP, adds the LSP2 to the layer association group, and returns a result of path computation to the node 2.

In step S5, as a PCC, the node 1 sends a PCReq message to the PCE, and requests to compute the service layer LSP1 from the node 1 to the node 3, and the message carries the Association object including the LAYER ASSOCIATION TLV.

The H bit is set to 1 to notify the PCE that the LSP is an upper-layer LSP, and the LSP is added to the layer association group.

In step S6, the PCE computes a path of a service layer, saves information on the LSP, adds the LSP to the layer association group, and returns a result of path computation to the node 1.

Example Two

Figure 8:
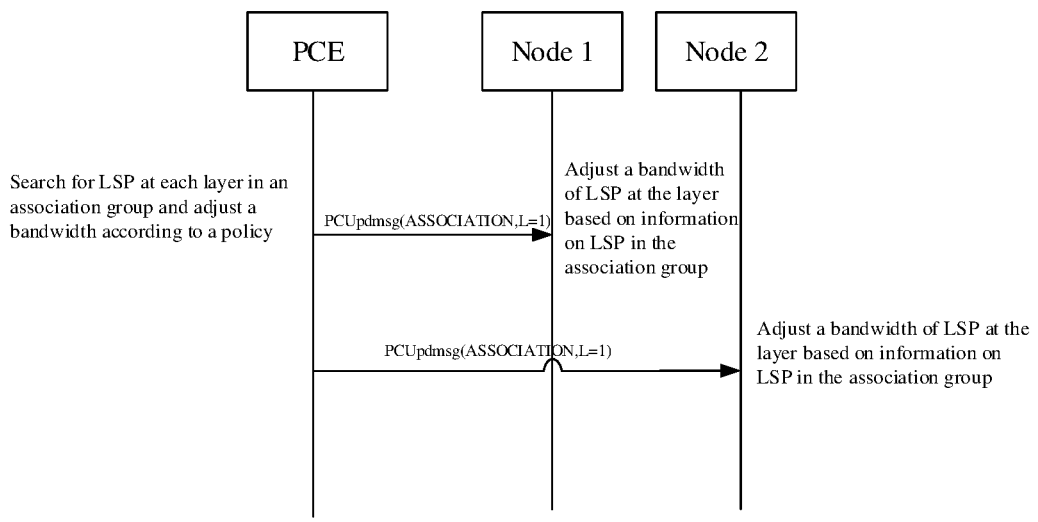
FIG. 8 is a flow diagram showing bandwidth adjustment of multi-layer LSPs according to an embodiment of the present disclosure.

A stateful PCE requests to adjust a bandwidth of the upper-layer LSP. In this case, adjustment of a bandwidth of a service layer LSP of the upper-layer LSP should also be considered. Before requesting to adjust the bandwidth of the upper-layer LSP, the PCE may search for the associated LSPs based on information on the lower-layer LSP in the association group. If the bandwidth of the upper-layer LSP is to be increased, a bandwidth of the service layer is adjusted firstly. If the bandwidth of the upper-layer LSP is to be decreased, the bandwidth of the upper-layer LSP is adjusted firstly and then the bandwidth of the service layer LSP is adjusted. After the path is computed and the resources are adjusted, a PCUpd message is sent to the PCC to request to adjust the bandwidth of the associated layer LSP. As shown in FIG. 8, the interaction process between the PCE and the PCC is as follows.

In step S1, the PCE searches for the associated LSPs according to information on the lower-layer LSP in the association group, adjusts resources according to a bandwidth adjustment policy, computes the path, and sends a PCUpd message to the node 1 to request to adjust the bandwidth of the upper-layer LSP. The PCUpd message carries the Association object, which includes an Association list of multiple LSPs, including the corresponding LAYER ASSOCIATION TLV.

In step S2, upon reception of the PCUpd message, the node 1 searches for the upper-layer LSP and the lower-layer LSP corresponding to the upper-layer LSP based on the Association group, and adjusts bandwidths of the associated LSPs according to a bandwidth adjustment policy.

Example Three

Figure 9:
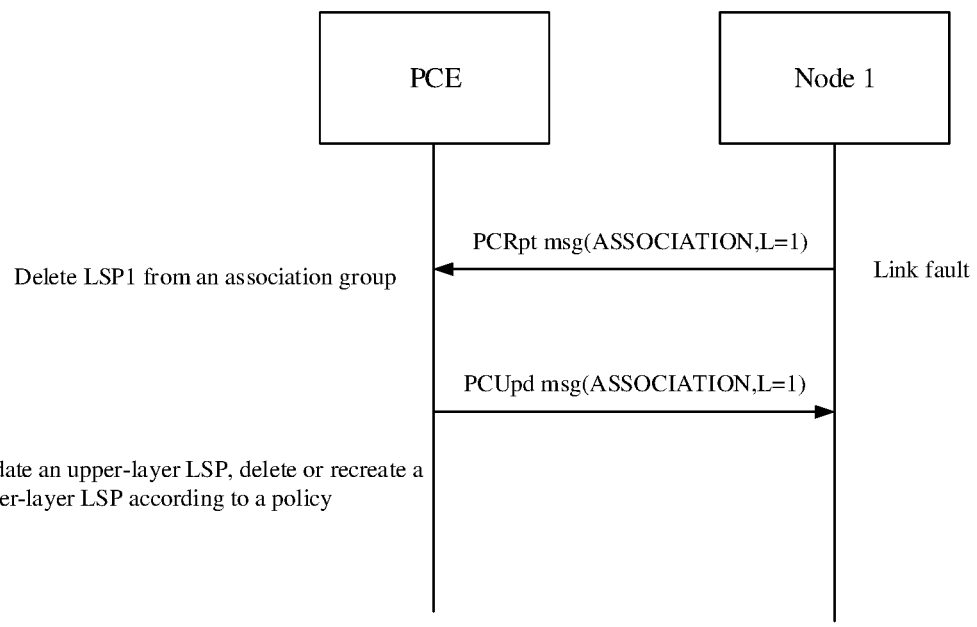
FIG. 9 is a flow diagram showing fault reporting of a lower-layer LSP in an association group according to an embodiment of the present disclosure.

In case that the lower-layer LSP changes, for example, a broken link fault or deletion of the lower-layer LSP occurs, the PCC searches for the upper-layer LSP corresponding to the lower-layer LSP based on the information on the association group, and sends a PCRpt message to notify the PCE. As shown in FIG. 9, the interaction process between the PCE and the PCC is as follows.

In step S1, the link between the node 1 and the node 2 fails. The node 1 sends a PCRpt message to notify the PCE. The PCRpt message carries the Association object to delete the LSP from the association group, which includes the LAYER ASSOCIATION TLV, and the L bit is set to 1.

In step S2, upon reception of the message, the PCE searches for the association group based on the Association object, deletes the lower-layer LSP, and searches for the upper-layer LSP corresponding to the lower-layer LSP, reports an alarm of a link fault of the upper-layer LSP, updates the upper-layer LSP, and recreates a lower-layer LSP or deletes the multi-layer LSPs according to the policy.

Figure 10:
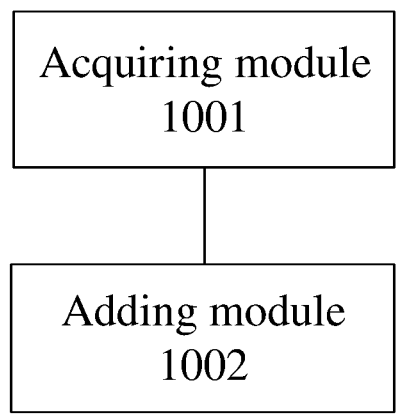
FIG. 10 is a block diagram showing a structure of an apparatus for controlling multi-layer LSPs according to an embodiment of the present disclosure.

An apparatus for controlling multi-layer LSPs is also provided according to the embodiment of the present disclosure, as described in the following embodiments. Since the principle of solving the problem by the apparatus for controlling the multi-layer LSPs is similar to that of the method for controlling the multi-layer LSPs, the implementation of the method for controlling the multi-layer LSPs may be referred to for the implementation of the apparatus for controlling the multi-layer LSPs, and the repeated description is not described. As used hereinafter, the term "unit" or "module" may implement a combination of software and/or hardware of a predetermined function. Although the apparatus described in the following embodiments may be implemented in software, hardware or a combination of software and hardware is also possible and conceivable. FIG. 3 is a structural block diagram of an apparatus for controlling multi-layer LSPs according to an embodiment of the present disclosure. As shown in FIG. 10, the apparatus may include an obtaining module 1001 and an adding module 1002. The structure will be described below.

The acquiring module 1001 is arranged to acquire an LSP addition request, where the above-described LSP addition request carries identifier information for identifying a layer association group, to which an LSP is to be added.

The adding module 1002 is arranged to add the LSP to the layer association group in response to the above-described LSP addition request, where the above-described layer association group includes an upper-layer LSP and a number of lower-layer LSPs.

In an embodiment, a PCC or a PCE is responsible for creating the above-described layer association group.

In an embodiment, the upper-layer LSP and the number of lower-layer LSPs in the above-described layer association group are associated by using an ASSOCIATION object.

In an embodiment, the above-described ASSOCIATION object is in a format of including a field for identifying a type of the ASSOCIATION object, and the field is used to indicate that a current association group is the layer association group.

In an embodiment, a type of each LSP in the above-described layer association group is indicated by a bit indicating the type of the LSP in a layer association type-length-value (TLV), where the type of the LSP includes an upper-layer LSP and a lower-layer LSP.

In an embodiment, the above-described apparatus may further include a first receiving module, a first searching module and a deleting module. The first receiving module is arranged to receive an upper-layer LSP deletion request. The first searching module is arranged to search the above-described layer association group for at least one lower-layer LSP associated with the upper-layer LSP requested to be deleted in the upper-layer LSP deletion request, in response to the above-described upper-layer LSP deletion request. The deleting module is arranged to delete the upper-layer LSP requested to be deleted in the above-described delete upper-layer LSP request, and delete the at least one low-layer LSP associated with the upper-layer LSP requested to be deleted in the above-described delete upper-layer LSP request, in batches.

In an embodiment, the above-described apparatus may further include a second receiving module, a first adjusting module and a second adjusting module. The second receiving module is arranged to receive an upper-layer LSP bandwidth adjustment request. The first adjusting module is arranged to, in case that the upper-layer LSP bandwidth adjustment request is a request for increasing a bandwidth of the upper-layer LSP, firstly search, the layer association group, for all the lower-layer LSPs corresponding to the layer association group, adjust bandwidths of the lower-layer LSPs, and then adjust the bandwidth of the upper-layer LSP. The second adjusting module is arranged to, in case that the upper-layer LSP bandwidth adjustment request is a request for decreasing the bandwidth of the upper-layer LSP, firstly adjust the bandwidth of the upper-layer LSP, and then search the layer association group for all the lower-layer LSPs corresponding to the layer association group and adjust the bandwidths of the lower-layer LSPs.

In an embodiment, the apparatus may further include a third receiving module, a second searching module and a processing module. The third receiving module is arranged to receive a low-layer LSP request, where the low-layer LSP request includes at least one of the following: a delete request, or a fault alarm request. The second searching module is arranged to search the layer association group for the upper-layer LSP associated with the lower layer LSP requested in the lower-layer LSP request, in response to the low-layer LSP request. The processing module is arranged to perform the low-layer LSP request according to a local policy, notify the upper-layer LSP that is searched out, and perform related processing on the upper-layer LSP that is searched out according to the local policy.

In another embodiment, software is also provided for performing the solutions described in the above-described embodiments and implementations.

A computer-readable storage medium is further provided according to the embodiments of the present disclosure, having stored thereon computer-executable instructions for achieving any of the methods described above when being executed by a processor.

It can be seen from the above description that, the present disclosure has the following beneficial effects. By creating to a layer association group and adding LSP(s) to the layer association group, an association group of the multi-layer LSPs is realized, and optimal control of the multi-layer LSPs is realized, thereby solving the problem that the multi-layer LSPs cannot be easily and effectively associated. The technical effects are achieved that the message interaction between the PCC and the PCE is effectively reduced and the control efficiency of the multi-layer LSPs is optimized.

Those skilled in the art will understand that, functional blocks/units in all or some of the steps, systems, and apparatus in the methods disclosed above may be implemented as software, firmware, hardware, and a suitable combination thereof. In a hardware implementation, the division between functional modules/units mentioned in the above description does not necessarily correspond to the division of physical components. For example, one physical component may have multiple functions, or one function or step may be performed by several physical components cooperatively. Some or all of the components may be implemented as software executed by a processor, such as a digital signal processor or a microprocessor, or as hardware, or as an integrated circuit, such as a specific integrated circuit. Such software may be distributed on a computer-readable medium which may include computer storage media (or non-transitory media) and communication media (or transitory media). As is well known to those skilled in the art, the term computer storage media includes volatile and nonvolatile media, removable and non-removable media implemented in any method or technology for storing information, such as computer-readable instructions, data structures, program modules or other data. The computer storage media includes, but is not limited to, RAM, ROM, EEPROM, flash memory or other memory technology, CD-ROM, digital versatile disc (DVD) or other optical disc storage, magnetic cassette, magnetic tape, magnetic disk storage or other magnetic storage device, or any other medium for storing the desired information and that can be accessed by a computer. Moreover, it is well known to those skilled in the art that communication media generally includes computer-readable instructions, data structures, program modules, or other data in a modulated data signal, such as a carrier or other transmission scheme, and may include any information delivery media.

Although the exemplary embodiments of the present disclosure have been disclosed for purposes of illustration, those skilled in the art will recognize that various modifications, additions and substitutions are possible, and the scope of the present disclosure should not be limited to the above-described embodiments.

INDUSTRIAL APPLICABILITY

According to the present disclosure, by creating a layer association group and adding LSP(s) to the layer association group, an association group of the multi-layer LSPs is realized, and optimal control of the multi-layer LSPs is realized, thereby solving the problem that the multi-layer LSPs cannot be easily and effectively associated. The technical effects are achieved that the message interaction between the PCC and the PCE is effectively reduced and the control efficiency of the multi-layer LSPs is optimized. Therefore, the present disclosure has the industrial applicability.

The invention claimed is:

1. A method for controlling multi-layer label switched paths (LSPs), comprising:
acquiring an LSP addition request, wherein the LSP addition request carries identifier information for identifying a layer association group, to which an LSP is to be added; and
adding the LSP to the layer association group in response to the LSP addition request, wherein the layer association group comprises an upper-layer LSP and a number of lower-layer LSPs;
wherein the upper-layer LSP and the number of lower-layer LSPs in the layer association group are associated by using an ASSOCIATION object; and
a type of each LSP in the layer association group is indicated by a bit indicating the type of the LSP in a layer association type-length-value (TLV), and the type of the LSP comprises an upper-layer LSP and a lower-layer LSP.

2. The method according to claim 1, wherein a path computation client (PCC) or a path computation element (PCE) is responsible for creating and deleting the layer association group, and for adding one or more LSPs to or deleting one or more LSPs from the layer association group.

3. The method according to claim 1, wherein the ASSOCIATION object is in a format of including a field for identifying a type of the ASSOCIATION object, and the field is used to indicate that a current association group is the layer association group.

4. The method according to claim 1, further comprising:
receiving an upper-layer LSP deletion request;
searching the layer association group for at least one lower-layer LSP associated with the upper-layer LSP requested to be deleted in the upper-layer LSP deletion request, in response to the upper-layer LSP deletion request; and
deleting the upper-layer LSP requested to be deleted in the upper-layer LSP deletion request, and deleting the at least one low-layer LSP associated with the upper-layer LSP requested to be deleted in the upper-layer LSP deletion request, in batches.

5. The method according to claim 1, further comprising:
receiving an upper-layer LSP bandwidth adjustment request; and
in case that the upper-layer LSP bandwidth adjustment request is a request for increasing a bandwidth of the upper-layer LSP, firstly searching, the layer association group for all the lower-layer LSPs corresponding to the layer association group, adjusting bandwidths of the lower-layer LSPs, and then adjusting the bandwidth of the upper-layer LSP; or
in case that the upper-layer LSP bandwidth adjustment request is a request for decreasing the bandwidth of the upper-layer LSP, firstly adjusting the bandwidth of the upper-layer LSP, and then searching the layer association group for all the lower-layer LSPs corresponding to the layer association group and adjusting the bandwidths of the lower-layer LSPs.

6. The method according to claim 1, further comprising:
receiving a low-layer LSP request, wherein the low-layer LSP request comprises at least one of the following: a delete request, or a fault alarm request;
searching the layer association group for the upper-layer LSP associated with the lower layer LSP requested in the lower-layer LSP request, in response to the low-layer LSP request; and
performing the low-layer LSP request according to a local policy, notifying the upper-layer LSP that is searched out, and performing related processing on the upper-layer LSP that is searched out according to the local policy.

7. An apparatus for controlling multi-layer label switched paths (LSPs), comprising:
a processor; and
a memory storing instructions, which, when executed by the processor, cause the processor to implement a method for controlling multi-layer LSPs, comprising:
acquiring an LSP addition request, wherein the LSP addition request carries identifier information for identifying a layer association group, to which an LSP is to be added; and
adding the LSP to the layer association group in response to the LSP addition request, wherein the layer association group comprises an upper-layer LSP and a number of lower-layer LSPs;
wherein the upper-layer LSP and the number of lower-layer LSPs in the layer association group are associated by using an ASSOCIATION object; and
a type of each LSP in the layer association group is indicated by a bit indicating the type of the LSP in a layer association type-length-value (TLV), and the type of the LSP comprises an upper-layer LSP and a lower-layer LSP.

8. The apparatus according to claim 7, wherein a path computation client (PCC) or a path computation element (PCE) is responsible for creating and deleting the layer association group, and for adding one or more LSPs to or deleting one or more LSPs from the layer association group.

9. The apparatus according to claim 7, wherein the ASSOCIATION object is in a format of including a field for identifying a type of the ASSOCIATION object, and the field is used to indicate that a current association group is the layer association group.

10. The apparatus according to claim 7, wherein the method further comprises:
receiving an upper-layer LSP deletion request;
searching the layer association group for at least one lower-layer LSP associated with the upper-layer LSP requested to be deleted in the upper-layer LSP deletion request, in response to the upper-layer LSP deletion request; and
deleting the upper-layer LSP requested to be deleted in the delete upper-layer LSP request, and deleting the at least one low-layer LSP associated with the upper-layer LSP requested to be deleted in the delete upper-layer LSP request, in batches.

11. The apparatus according to claim 7, wherein the method further comprises:
receiving an upper-layer LSP bandwidth adjustment request;
in case that the upper-layer LSP bandwidth adjustment request is a request for increasing a bandwidth of the upper-layer LSP, firstly searching, the layer association group, for all the lower-layer LSPs corresponding to the layer association group, adjusting bandwidths of the lower-layer LSPs, and then adjusting the bandwidth of the upper-layer LSP;
in case that the upper-layer LSP bandwidth adjustment request is a request for decreasing the bandwidth of the upper-layer LSP, firstly adjusting the bandwidth of the upper-layer LSP, and then searching the layer association group for all the lower-layer LSPs corresponding to the layer association group and adjusting the bandwidths of the lower-layer LSPs.

12. The apparatus according to claim 7, wherein the method further comprises:
receiving a low-layer LSP request, wherein the low-layer LSP request comprises at least one of the following: a delete request, or a fault alarm request;
searching the layer association group for the upper-layer LSP associated with the lower layer LSP requested in the lower-layer LSP request, in response to the low-layer LSP request; and
performing the low-layer LSP request according to a local policy, notifying the upper-layer LSP that is searched out, and performing related processing on the upper-layer LSP that is searched out according to the local policy.

13. A non-transitory computer-readable storage medium having stored thereon computer-executable instructions, which when being executed by a processor, implement a method for controlling multi-layer label switched paths (LSPs), comprising:

acquiring an LSP addition request, wherein the LSP addition request carries identifier information for identifying a layer association group, to which an LSP is to be added; and adding the LSP to the layer association group in response to the LSP addition request, wherein the layer association group comprises an upper-layer LSP and a number of lower-layer LSPs;

wherein the upper-layer LSP and the number of lower-layer LSPs in the layer association group are associated by using an ASSOCIATION object; and a type of each LSP in the layer association group is indicated by a bit indicating the type of the LSP in a layer association type-length-value (TLV), and the type of the LSP comprises an upper-layer LSP and a lower-layer LSP.

14. The non-transitory computer-readable storage medium according to claim 13, wherein a path computation client (PCC) or a path computation element (PCE) is responsible for creating and deleting the layer association group, and for adding one or more LSPs to or deleting one or more LSPs from the layer association group.

15. The non-transitory computer-readable storage medium according to claim 13, wherein the ASSOCIATION object is in a format of including a field for identifying a type of the ASSOCIATION object, and the field is used to indicate that a current association group is the layer association group.

* * * * *